(12) United States Patent
Eslambolchi et al.

(10) Patent No.: US 6,215,888 B1
(45) Date of Patent: Apr. 10, 2001

(54) CABLE LOCATION METHOD AND APPARATUS USING MODELING DATA

(75) Inventors: Hossein Eslambolchi, Basking Ridge, NJ (US); John Sinclair Huffman, McDonough, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/095,238

(22) Filed: Jun. 10, 1998

(51) Int. Cl.[7] .................................................. G06K 9/00
(52) U.S. Cl. ............................ 382/100; 378/21; 324/326
(58) Field of Search ........................... 340/566; 324/326, 324/133, 233, 529; 342/459, 22, 28; 361/119; 505/164; 436/56; 382/100; 378/88, 21

(56) References Cited

U.S. PATENT DOCUMENTS

| | | | |
|---|---|---|---|
| 4,881,083 | * 11/1989 | Chau et al. | 342/459 |
| 5,093,622 | * 3/1992 | Balkman | 324/326 |
| 5,264,795 | * 11/1993 | Rider | 324/326 |
| 5,446,446 | * 8/1995 | Harman | 340/566 |
| 5,448,222 | * 9/1995 | Harman | 340/566 |
| 5,471,143 | * 11/1995 | Doany | 324/326 |
| 5,644,237 | 7/1997 | Eslambolchi et al. | 324/326 |
| 5,721,662 | * 2/1998 | Glaser et al. | 361/119 |
| 5,745,384 | * 4/1998 | Lanzerotti et al. | 364/574 |
| 5,920,194 | * 7/1999 | Lewis et al. | 324/326 |

* cited by examiner

*Primary Examiner*—Matthew C. Bella
*Assistant Examiner*—M B Choobin
(74) *Attorney, Agent, or Firm*—Robert B. Levy

(57) ABSTRACT

More accurate location of a buried utility conveyance (10) is obtained by first detecting, via a detector (34) the actual pattern of radiation (26, 28) of a locating signal impressed on the conveyance. The actual pattern of radiation is compared, by a processor (36) to each of a plurality of reference patterns stored in a database (38), each pattern representing the radiation for a conveyance having a known location. The processor selects the reference pattern that most closely the actual pattern and then provides an indication of the conveyance location associated with the selected reference pattern.

9 Claims, 2 Drawing Sheets

CABLE LOCATION METHOD AND APPARATUS USING MODELING DATA

TECHNICAL FIELD

This invention relates to a technique for locating a buried object, such as a pipe or cable, by comparing the radiation pattern of a locating signal impressed on the object to an expected radiation pattern for such a signal.

BACKGROUND ART

Many providers of electric and telephone service (hereinafter, "utilities") often bury their pipes or cables (hereinafter, "conveyances") underground both for reasons of safety and esthetics. During the burial process, the utility typically records both the depth and location of the conveyance so that others seeking to excavate in the same general vicinity can locate the conveyance, thereby avoiding damage during such excavation. At present, utilities that bury conveyances record the location of each such conveyance relative to existing physical landmarks, such as roads, buildings, or bridges for example. From knowledge of the recorded distance of a conveyance from a landmark, a contractor seeking to excavate in the general vicinity can locate the buried utility conveyance and avoid causing any damage during excavation.

Unfortunately, utilizing a physical landmark as a reference point for locating an underground utility conveyance does not always facilitate accurate location of the conveyance. Occasionally, physical landmarks undergo a change. For example, a road may undergo widening or repair that may alter its relative distance to the buried utility conveyance. A building may undergo renovation or even demolition, precluding the ability to utilize such a structure as a point of reference for a conveyance location measurement.

Given that burial records may not always yield an accurate indication of the location of an underground utility conveyance, most utilities must physically locate their buried conveyances in order to effect a repair as well as to provide warnings to excavating contractors. In practice, a technician from the utility physically locates a buried utility conveyance using a radio signal detector to detect a locating signal (typically, an alternating current signal) impressed on a conveyance of interest. The detector utilized by the technician typically includes one or more frequency-sensitive magnetometers for detecting the locating signal radiated by the buried conveyance. As a technician displaces the radio signal detector in the general vicinity of the buried conveyance, a pair of horizontally-mounted the magnetometers in the detector will measure a peak value of the locate signal when the technician is directly above the cable, assuming that the conveyance radiates the locating signal equally in a circular pattern.

Some radio signal detectors also include a vertically mounted, frequency-sensitive magnetometer that will indicate the locating signal on opposite of the conveyance, and a null indication when the detector is directly above the conveyance. Generally, the null indication provided by the vertically mounted magnetometer will correspond to the peak indication provided by the horizontally mounted magnetometer when the radio signal detector is directly above the conveyance of interest. Thus, the technician can establish the location of the conveyance of interest by displacing the detector until the peak signal from the horizontally mounted magnetometers coincides with the null signal from the vertically mounted magnetometer.

The above-described locating method works well when no other buried utility conveyances are present in the general vicinity of the conveyance of interest. However, other buried utility conveyances are often present in the same general area as the conveyance of interest and each such neighboring conveyance will radiate its own locating signal. These locating signals can interfere with each other. Consequently, a technician trying to locate a particular buried utility conveyance of interest will some times detect the peak and null signals at different locations, rather than the same location above the buried conveyance of interest. The interference between the locating signals of neighboring buried conveyances has led to mis-location of buried conveyances, and resultant conveyance failures as a result of such mis-location.

Thus, there is a need for a technique for improving the accuracy of buried utility conveyance location by radio signal detection.

BRIEF SUMMARY OF THE INVENTION

Briefly, the present invention provides a method for enabling a technician to locate a buried utility conveyance of interest that carries a locating signal that radiates in a pattern, even when that pattern is influenced by locating signals radiated by other buried conveyances in the vicinity of the conveyance of interest. Initially, a technician detects the actual pattern of radiation of the locating signal carried by the conveyance of interest, typically using a radio signal detector for this purpose. The actual pattern of radiation is compared to each of a plurality of reference patterns. Each reference pattern is typically produced by computer modeling and represents the pattern of radiation for a conveyance having a known location relative to the pattern notwithstanding interfering radiation for other nearby conveyances. Based on such comparison, a selection is made of the reference pattern that most closely the actual pattern. From the selected reference pattern, the technician can locate the conveyance based on the known conveyance location associated with the selected reference pattern.

DETAILED DESCRIPTION

Figure 1:
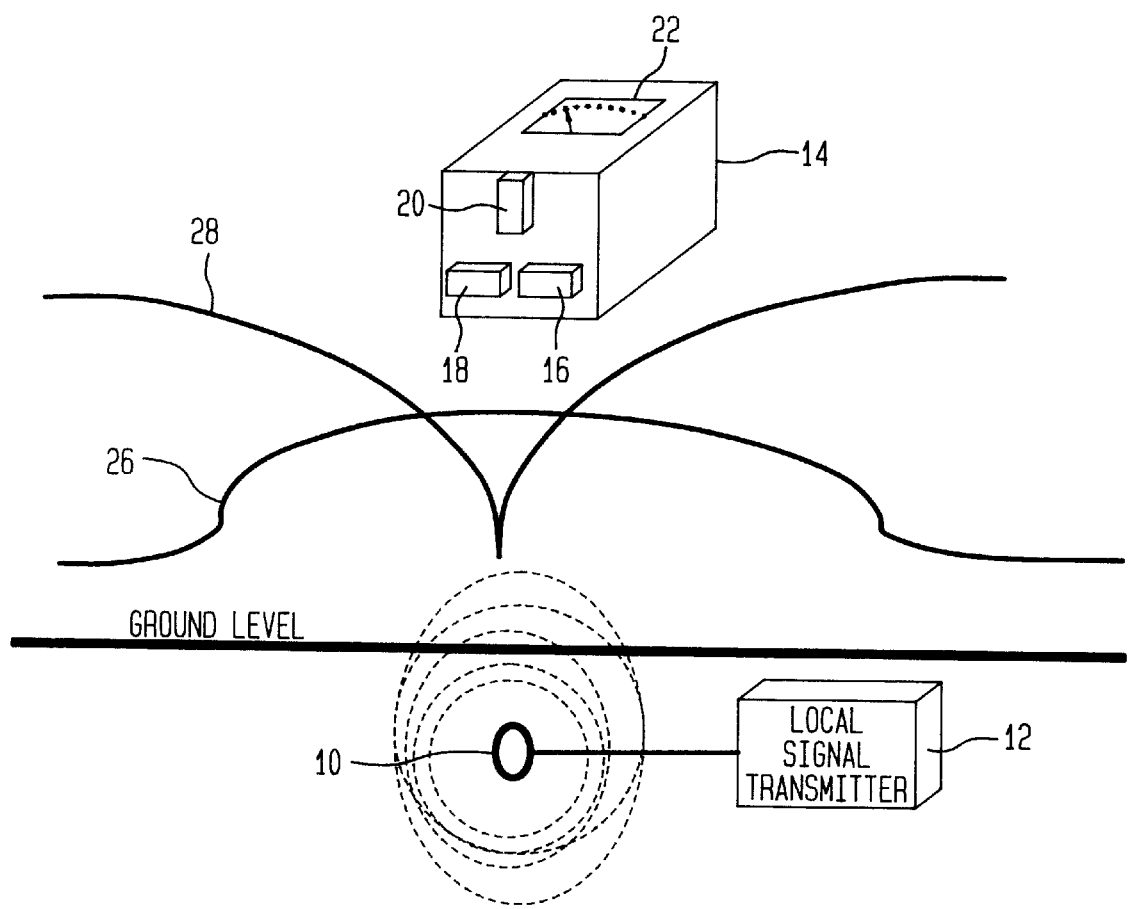
FIG. 1 graphically depicts a pattern of radiation of a locating signal impressed on a buried utility conveyance as detected by a prior art radio signal detector.

FIG. 1 depicts a utility conveyance 10, such as a telecommunication cable, buried underground, with ground level depicted by reference numeral 12. In practice the cable 10 carries a locating signal impressed on the cable by a locating signal transmitter 16, such as the type manufactured by Radiodetection Ltd., Bristol, England. Utilities that bury underground conveyances, such as the cable 10, typically apply a locating signal that is unique to that conveyance. For example, AT&T applies a locating signal of 440 Hz to its buried cables while other utilities employ different frequencies.

In practice, the locating signal applied by the transmitter 12 to the cable 10 radiates from the cable in a generally circular pattern as seen in FIG. 1. The pattern of radiation from the cable 10 enables a technician (not shown) to establish the location of the cable electronically, via the aid of a radio signal detector 14, such as the type manufactured by Radiodection Ltd. Depending on its construction, the radio signal detector 14 includes at least one, and preferably a plurality of frequency-sensitive magnetometers, illustratively depicted in FIG. 1 as magnetometers 16, 18 and 20, for detecting the signal radiated by the cable 10. In the illustrated embodiment, the magnetometers 16 and 18 are horizontally mounted and provide an output signal, indicated via a meter 22, representing the level of locating signal radiated by the cable 10. The pattern of the radiation level measured by the horizontally mounted magnetometers 16 and 18 is represented by the curve 26 in FIG. 1 which has its peak when the detector 14 is directly above the cable 10. Thus, the curve 26 will hereinafter be designated as the "peak radiation pattern."

In contrast, the magnetometer 20 is vertically mounted within the detector 14. Like the magnetometers 16 and 18, the magnetometer 20 also measures the level of the locating signal radiated by the cable 10, as indicated via the meter 22, or a separate meter (not shown). (When the detector 14 includes a single meter 22, a switch (not shown) serves to switch the meter between the horizontally mounted magnetometers 16 and 18, and the vertically mounted magnetometer 20.) The vertical mounting of the magnetometer 20 causes that magnetometer to measure a prescribed radiation level on opposite sides on the cable 10 an a null level when the radio signal detector 14 is directly above the cable. The pattern of the radiation level detected by the vertically mounted magnetometer is depicted by curve 28. Since the curve 28 exhibits a null when the detector 14 is directly above the cable, this curve is hereinafter referred to as the "null radiation pattern."

As shown in FIG. 1, the pattern of the radiation level measured by the magnetometers 16 and 18 (represented by curve 26) generally varies inversely to pattern of the radiation level measured by the magnetometer 20 (represented by the curve 28). In other words, the null or minimum of the curve 28 corresponds exactly to the peak of the radiation level represented by the curve 26 when the signal detector 14 is directly above the cable. Thus, to locate the cable 10, the technician displaces the signal detector to match the null level of the curve 28 (as indicated by the corresponding reading of the meter 22) to the peak level of the curve 26, as indicated by the corresponding meter reading.

Figure 2:
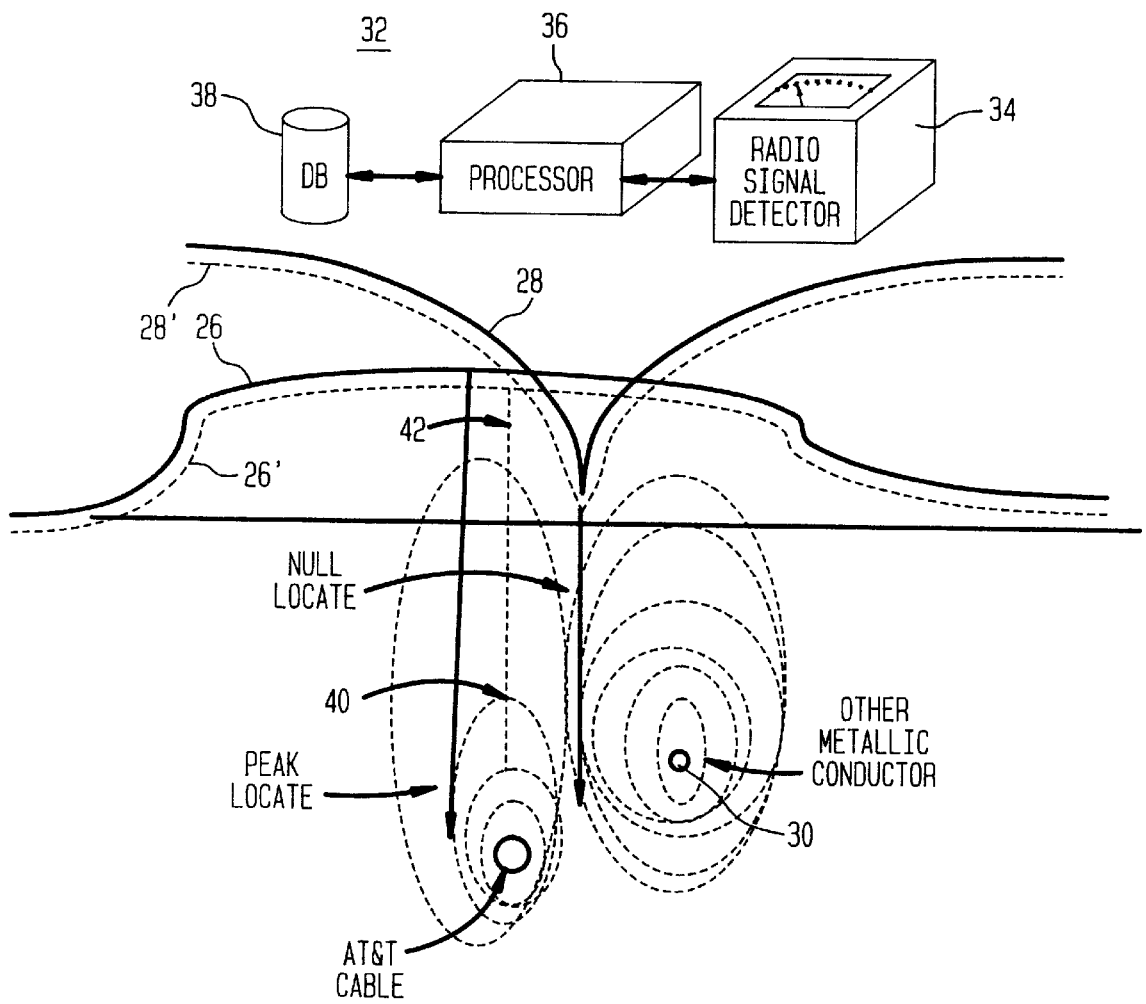
FIG. 2 graphically depicts a comparison of the actual radiation associated with the utility conveyance of FIG. 1 to a computer-modeled reference pattern to more accurately locate the conveyance in accordance with the invention.

The above-described locating technique works well when there are no other buried conveyances in the vicinity of the conveyance 10. Referring now to FIG. 2, if there is another buried conveyance, such as the cable 30, in proximity to the cable 10, the locating signals impressed on the two conveyances often interfere. As a result, the peak and null patterns, represented by the solid lines 26 and 28, respectively, have peak and null values, respectively, that do not correspond with the actual location of the cable 10. Thus, the use of the prior art radio signal detector 14 can lead to mis-locates when other conveyances, such as the cable 30, lie in proximity to the cable 10 of interest.

In accordance with the invention, the accuracy by which the cable 10 is located can be significantly improved by using pre-computed or model radiation patterns that indicate the expected cable position under various conditions (including interfering locating signals) and by matching such reference patterns to the actually measured patterns. To facilitate cable location using such pre-computed patterns, a technician utilizes a detection system that includes a radio signal detector 34 having generally the same construction as the detector 14 of FIG. 1, a processor 36, and a data base 38, in the form of a mass storage device. For purposes of discussion, the detector 34, processor 36 and database 38 are shown as separate elements but could be configured as a single unit.

The database 38 stores a plurality of pairs of pre-computed peak and null radiation patterns, an exemplary pair of which are depicted in FIG. 2 as dashed lines 26' and 28', respectively. The patterns 26' and 28' represents models of the peak and null radiation patterns, respectively, for a particular frequency under a prescribed condition, such as when the cable 10 is proximate another conveyance, such as the conveyance 30 emanating an interfering locating signal. In practice, pairs of modeled pair of peak and null curves is typically computed by the processor 36, or another processor for various conditions, such as when there are different numbers and types of underground conveyances with different frequency locating signals buried in the same vicinity as the cable 10.

Also associated with each pair of computer-modeled peak and null radiation patterns, such as patterns 26' and 28', respectively, are the corresponding true peak and null locations 40 and 42, respectively. The true peak and null locations 40 and 42 represent the exact peak and null locations, respectively, of the cable 10 for the associated with the modeled radiation patterns 26' and 28', respectively, and thus will coincide directly with the cable location. Because of the interference attributable to other nearby buried conveyances, the modeled patterns 26' and 28' will not have actual peak and null values that correspond to the true location of the cable. However, the true peak and null cable locations 40 and 42 (i.e., the physical location of the cable associated with such peak and null values) associated with the curves 26' and 28', respectively, can in fact be established. For example, we have found that actual separation between the peak and null radiation pattern locations, as determined by field measurement, is proportional to the actual distance of the cable from the measured peak and null locations. For example, if the peak and null location measurements are separated by twelve inches (25.4 cm), then the cable is actually about six inches (12.5 cm) from the peak locate position towards the null locate position. This information is added to the modeled radiation patterns stored in the database 38.

In operation, a technician utilizes the detector 34 to measure the peak and null patterns of the radiation levels, as represented by the curves 26 and 28. Upon receipt of the patterns from the detector 34, the processor 36 accesses the database 38 to compare the actual patterns to the reference patterns. Based on such a comparison, the processor 36 then selects the corresponding computer modeled peak and null patterns, such as the patterns 26' and 28', stored in the database 38, that most closely match the actual patterns. Upon finding a match, the processor 36 then determines the true peak and null cable locations 40 and 42, respectively, associated with the modeled patterns 26' and 28'. Since the true peak and null locations 40 and 42 correspond to the true location of the cable 10 for the modeled patterns, the process of matching the modeled peak and locate patterns to the actual peak and locate patterns allows for very accurate location of the cable 10.

The foregoing describes a technique for more accurately locating a buried utility conveyance by detecting the actual pattern of the level of the locating signal and then matching such pattern to a computer-modeled patterns that has a true cable location pattern associated therewith.

It is to be understood that the above-described embodiments are merely illustrative of the principles of the invention. Various modifications and changes may be made thereto by those skilled in the art, which will embody the principles of the invention and fall within the spirit and scope thereof. For example, while the present invention has been described in connection with the both peak and null patterns of the locating signal radiation, a single pattern, typically, the peak pattern, could be used.

What is claimed is:

1. A method for facilitating location of a buried utility conveyance of interest that carries a locating signal that has a particular radiation pattern, comprising the steps of:

detecting the actual pattern of radiation emanating independently from the conveyance of interest by virtue of the locating signal carried thereby;

comparing the actual pattern of radiation to each of a plurality of reference patterns, each representing a model pattern of the radiation emanating independently from the conveyance of interest under different conditions, and each reference pattern having a true conveyance location associated therewith, selecting, based on said comparing, the reference pattern that most closely matches the actual pattern; and determining, from the true conveyance location associated with said reference pattern most closely matching the actual pattern, the location of the conveyance of interest.

2. The method according to claim 1 wherein:

the detecting step includes the step of detecting actual peak and null patterns of radiation associated with said conveyance of interest.

3. The method according to claim 2 wherein the comparing step includes the step of comparing the actual peak and null patterns to corresponding peak and null reference patterns, respectively.

4. The method according to claim 3 wherein the selecting step includes the step of selecting the peak and null reference patters that most closely match the actual peak and null reference patterns, respectively.

5. The method according to claim 1 wherein the reference patterns are established by computer modeling.

6. A method for facilitating location of a buried utility conveyance of interest that carries a locating signal that has particular null and peak radiation patterns, comprising the steps of:

detecting the actual peak and null patterns of radiation associated with the conveyance of interest;

comparing the actual peak and null patterns of radiation to each of a plurality of peak and null reference patterns, each peak and null representing a model pattern associated with the peak and null radiation, respectively, for the conveyance of interest under different conditions, and each peak and null reference pattern having a true conveyance location associated therewith, selecting, based on said comparison, the peak and null reference patterns that most closely match the actual peak and null patterns, respectively; and determining, from the true conveyance location associated with said peak and null reference patterns most closely matching the actual peak and null patterns, respectively, the location of the conveyance of interest.

7. The method according to claim 6 wherein the peak and null reference patterns are established by computer modeling.

8. Apparatus for facilitating location of a buried utility conveyance of interest that carries a locating signal that has a particular radiation pattern, comprising the steps of:

means for detecting the actual pattern of radiation associated with the conveyance of interest;

means for comparing the actual pattern of radiation to each of a plurality of reference patterns, each representing a model pattern associated with the radiation for the conveyance of interest under different conditions, and each reference pattern having a true conveyance location associated therewith, means for selecting, based on said comparing, the reference pattern that most closely matches the actual pattern; and means for determining, from the true conveyance location associated with said reference pattern most closely matching the actual pattern, the location of the conveyance of interest.

9. Apparatus for facilitating location of a buried utility conveyance of interest that carries a locating signal that has particular null and peak radiation patterns, comprising:

means for detecting the actual peak and null patterns of radiation emanating independently from the conveyance of interest by virtue of the locating signal carried thereby;

means for comparing the actual peak and null patterns of radiation emanating independently from the conveyance of interest to each of a plurality of peak and null reference patterns, each peak and null reference pattern representing a model pattern associated with the peak and null radiation, respectively, emanating independently from the conveyance of interest under different conditions, and each peak and null reference pattern having a true conveyance location associated therewith, means for selecting, based on said comparison, the peak and null reference patterns that most closely match the actual peak and null patterns, respectively; and means for determining, from the true conveyance location associated with said peak and null reference patterns most closely matching the actual peak and null patterns, respectively, the location of the conveyance of interest.

* * * * *